(12) United States Patent
Eo et al.

(10) Patent No.: US 9,897,164 B2
(45) Date of Patent: Feb. 20, 2018

(54) TRANSMISSION FOR VEHICLE

(71) Applicant: HYUNDAI MOTOR COMPANY, Seoul (KR)

(72) Inventors: Soon Ki Eo, Ansan-si (KR); Chon Ok Kim, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 251 days.

(21) Appl. No.: 14/819,114

(22) Filed: Aug. 5, 2015

(65) Prior Publication Data

US 2016/0230846 A1 Aug. 11, 2016

(30) Foreign Application Priority Data

Feb. 5, 2015 (KR) ........................ 10-2015-0017960

(51) Int. Cl.
*F16H 37/06* (2006.01)
*F16H 3/00* (2006.01)

(52) U.S. Cl.
CPC ....... *F16H 3/006* (2013.01); *F16H 2003/007* (2013.01)

(58) Field of Classification Search
CPC ...................... F16H 37/021; F16H 2003/0931
USPC .................... 74/330, 331, 333, 340
See application file for complete search history.

(56) References Cited

U.S. PATENT DOCUMENTS

| 4,463,621 A * | 8/1984 | Fisher | F16H 3/006 192/48.6 |
| 4,679,454 A * | 7/1987 | Polak | F16H 3/091 74/330 |
| 5,823,051 A * | 10/1998 | Hall, III | F16H 3/006 475/207 |
| 7,107,866 B2 * | 9/2006 | Baldwin | F16H 3/006 74/331 |
| 7,409,886 B2 * | 8/2008 | Gitt | F16H 3/006 74/329 |
| 8,495,925 B2 | 7/2013 | Pesola et al. | |
| 8,561,494 B2 * | 10/2013 | Okadome | F16H 3/093 74/330 |

FOREIGN PATENT DOCUMENTS

| JP | 2003 247611 A | 9/2003 |
| JP | 2005-076875 A | 3/2005 |
| JP | 2005-195115 | 7/2005 |

(Continued)

*Primary Examiner* — Ha Dinh Ho
(74) *Attorney, Agent, or Firm* — Brinks Gilson & Lione

(57) ABSTRACT

A transmission includes: first and second input shafts receiving power from an engine; an output shaft arranged in parallel with the first input shaft; first and second countershafts arranged in parallel with the first and second input shafts, respectively; a first shift unit making desired gear shifts between the first input shaft and the output shaft, and between the first input shaft and the first countershaft; a second shift unit arranged between the second input shaft and the second countershaft in order to perform of duplicate gear shifts; a power connection unit transmitting power from the first countershaft to the output shaft; and a one-way clutch transmitting power from the engine to the power connection unit through the second shift unit. In particular, each duplicate gear shift has a gear ratio substantially identical to at least one gear ratio of the gear shifts of the first shift unit.

12 Claims, 9 Drawing Sheets

(56) References Cited

FOREIGN PATENT DOCUMENTS

| JP | 2013-119280 A | 6/2013 |
|---|---|---|
| JP | 2013-119882 | 6/2013 |
| KR | 10-2012-0043347 A | 5/2012 |
| KR | 10-1198701 B1 | 11/2012 |
| WO | 2004-097266 | 11/2004 |

* cited by examiner

[Fig. 1]
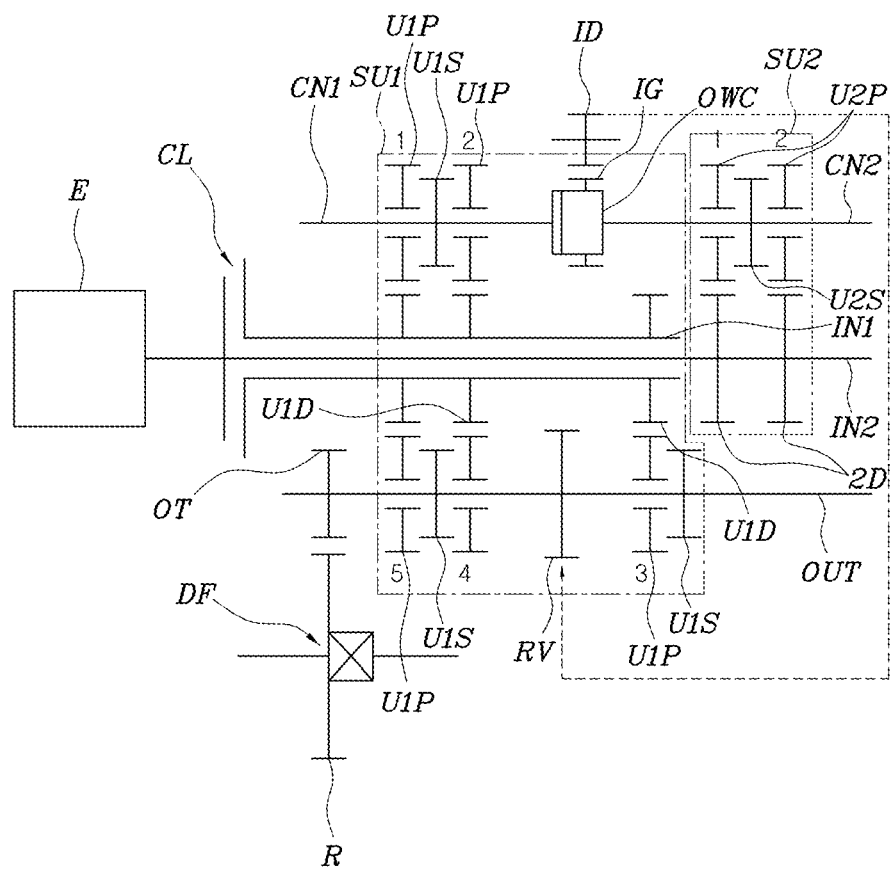

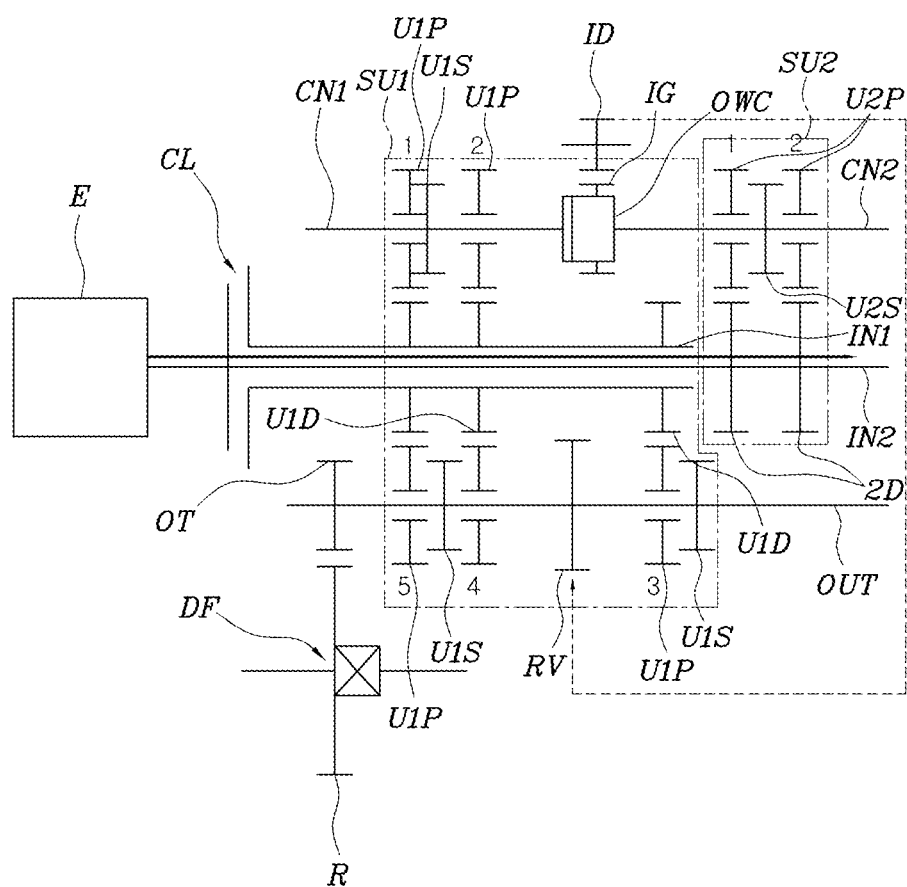
[Fig. 2]

[Fig. 3]
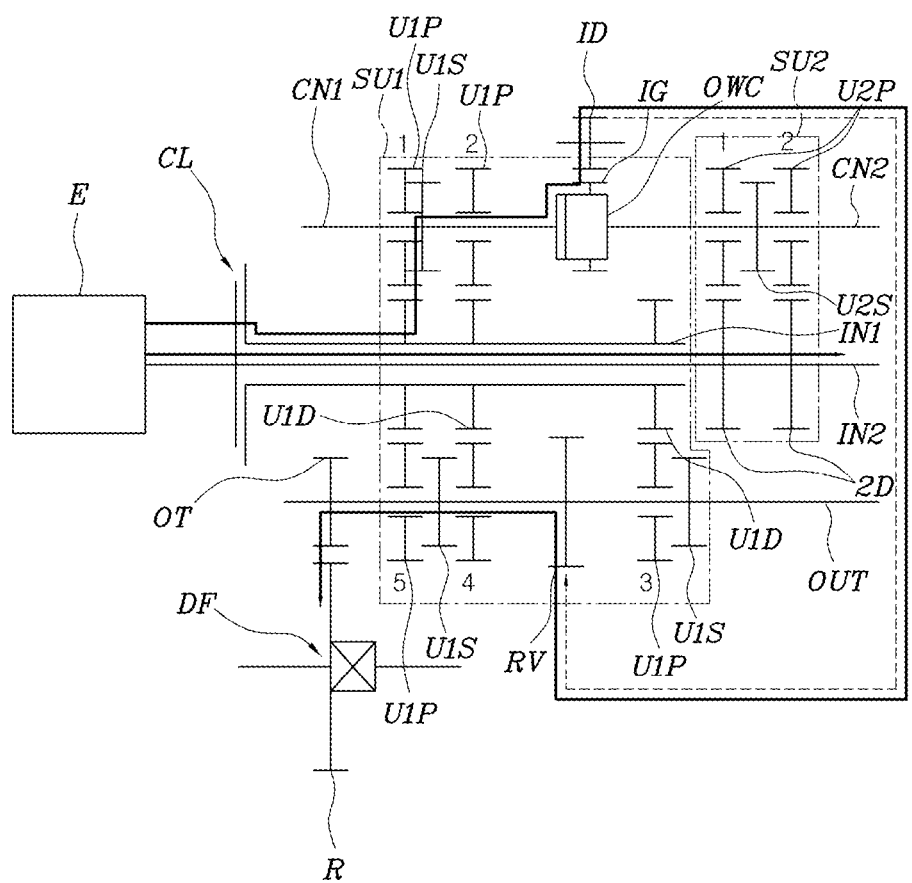

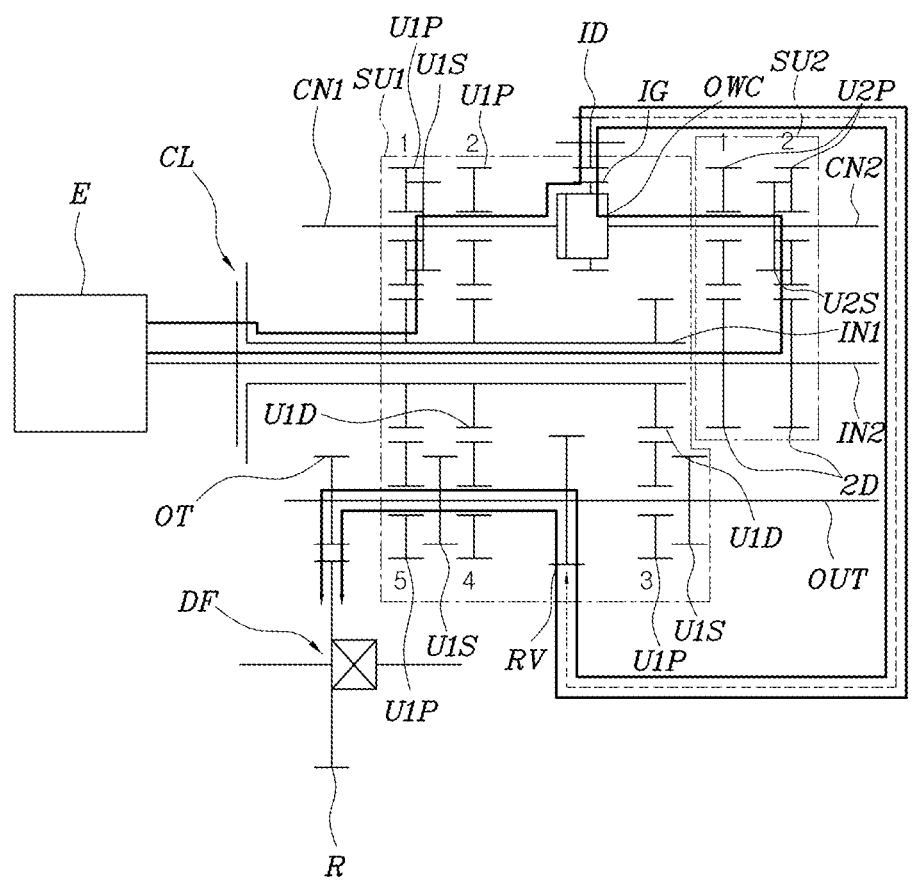
[Fig. 4]

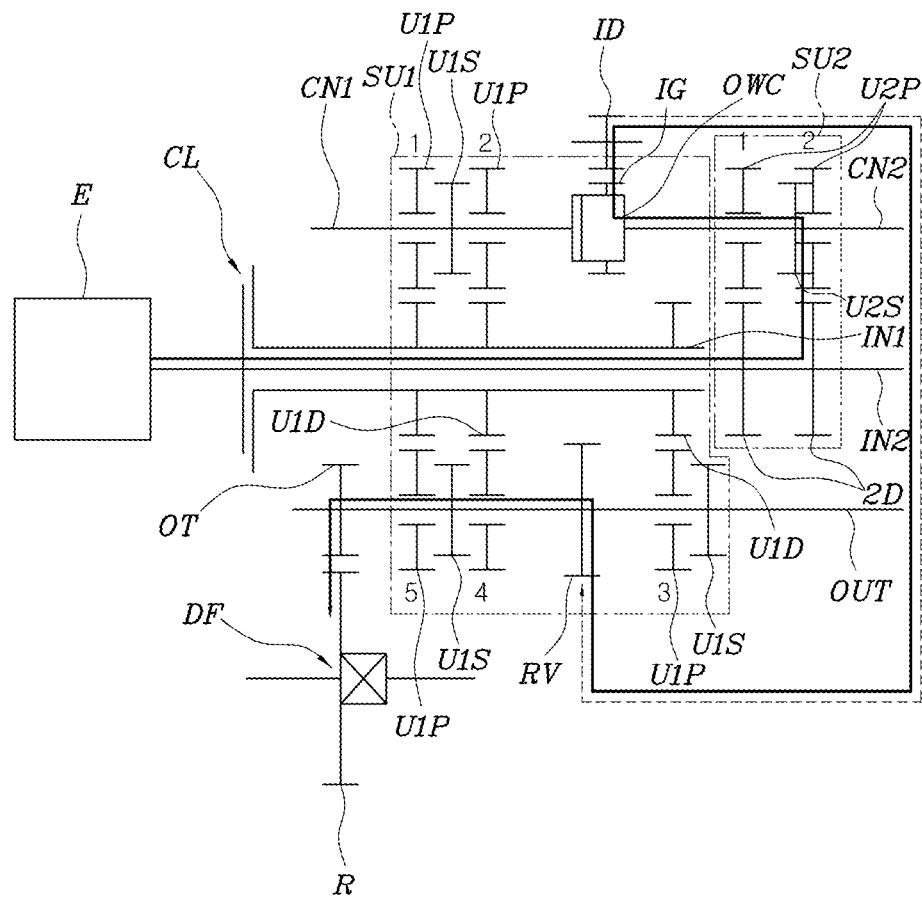
[Fig. 5]

[Fig. 6]
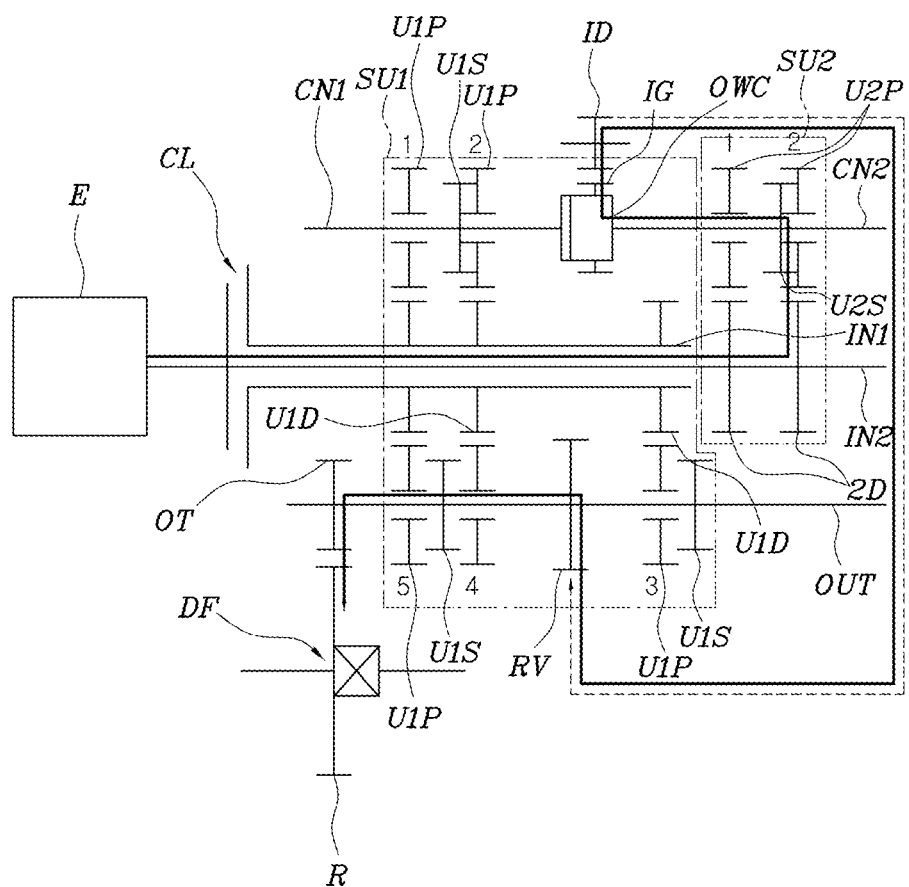

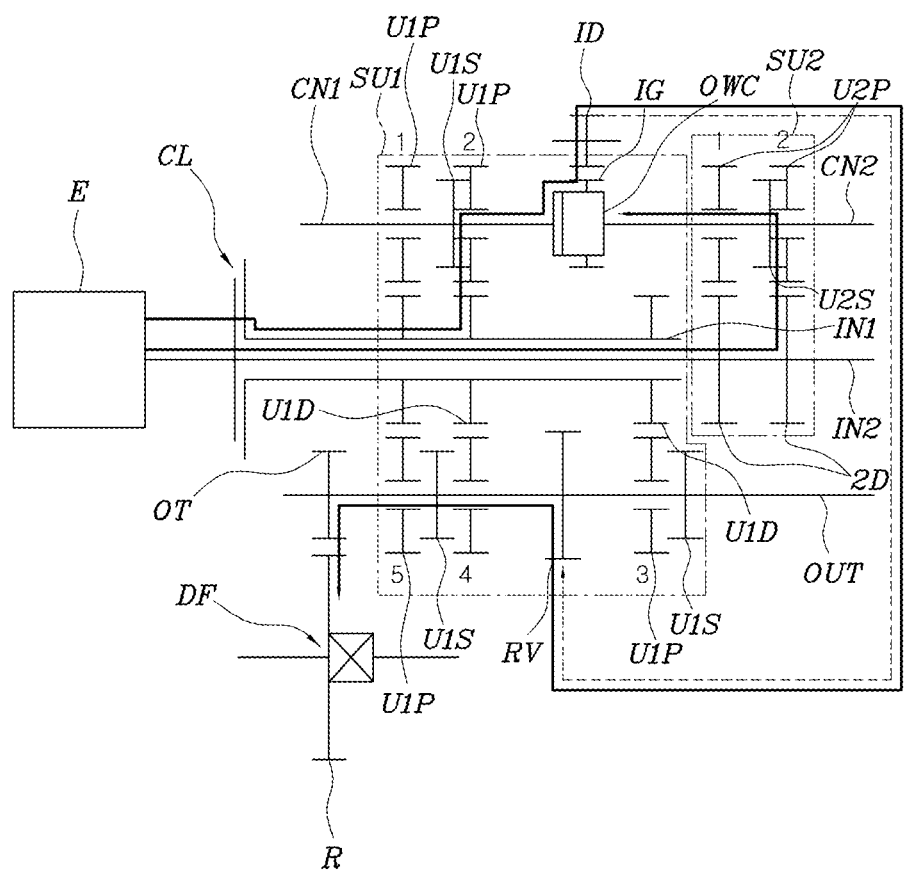
[Fig. 7]

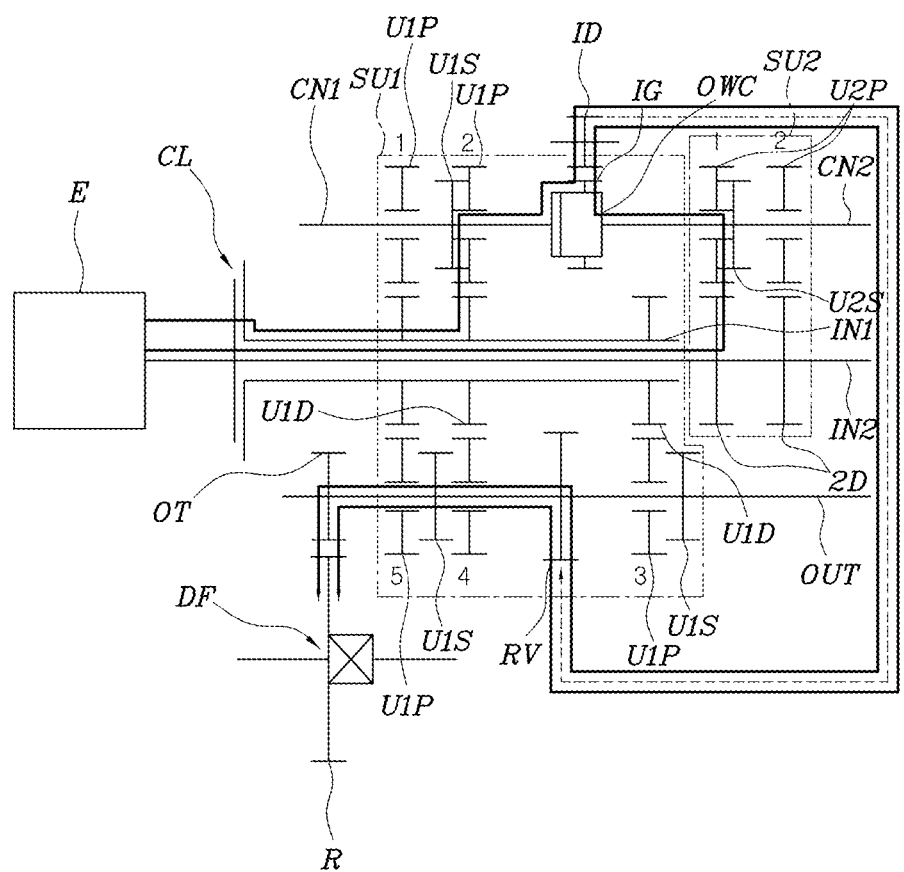
[Fig. 8]

[Fig. 9]
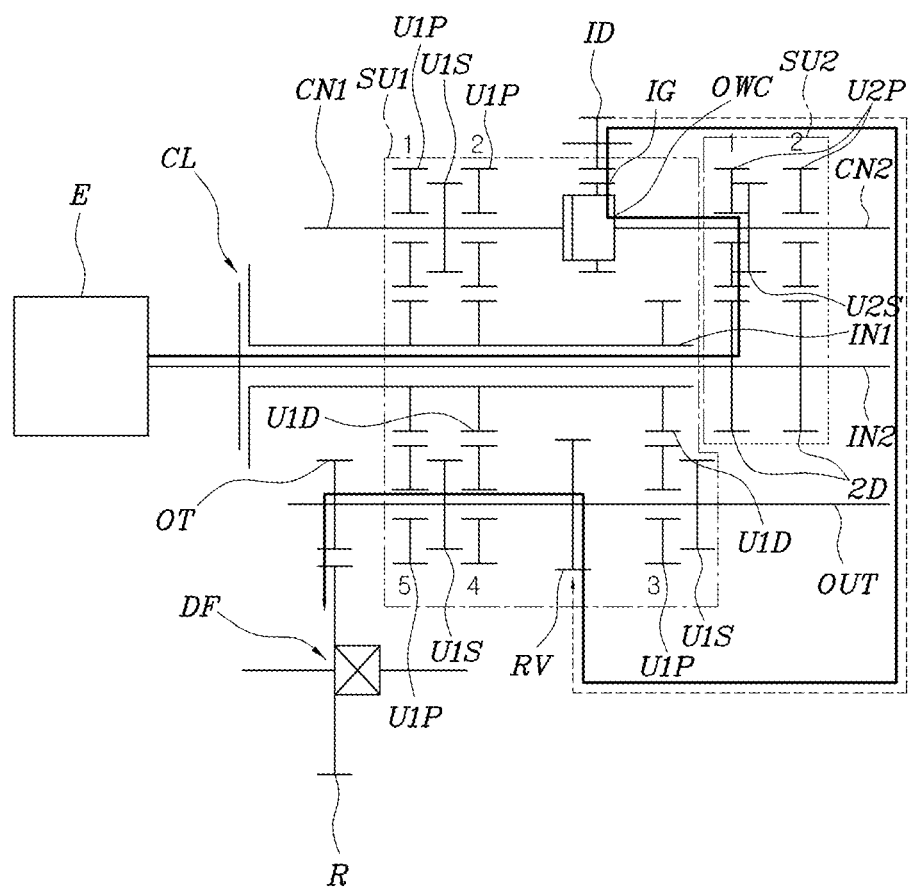

TRANSMISSION FOR VEHICLE

CROSS REFERENCE TO RELATED APPLICATION

The present application claims the benefit of Korean Patent Application Number 10-2015-0017960, filed on Feb. 5, 2015, which is hereby incorporated by reference herein in its entirety.

FIELD

The present disclosure relates to a transmission for a vehicle, and more particularly, to the configuration of a transmission that can automatically shift.

BACKGROUND

The statements in this section merely provide background information related to the present disclosure and may not constitute prior art.

In the related art, an AMT (Automated Manual Transmission) includes a clutch actuator for connecting/disconnecting a clutch and a shift actuator for engaging shift gears and disengaging desired shift gears and can automatically shift by operating the clutch actuator and the shift actuator in accordance with the driving states of a vehicle.

However, according to the AMT, it is required to cut torque from the clutch actuator to the AMT in order to disengage a previous shift gear and engage a new desired shift gear by operating the shift actuator. Such torque cut causes torque interruption due to cutting torque that is supposed to be supplied to driving wheels from an engine so that smooth shifting and comfort riding deteriorates.

The foregoing is intended merely to aid in the understanding of the background of the present disclosure, and is not intended to mean that the present disclosure falls within the purview of the related art that is already known to those skilled in the art.

SUMMARY

The present disclosure provides a transmission for a vehicle that can prevent deterioration of smooth shifting and comfort riding due to torque interruption in automated manual transmission. The transmission can be more conveniently mounted on a vehicle due to a relatively simple and compact configuration, and can contribute to improving fuel efficiency.

According to one aspect of the present disclosure, a transmission for a vehicle includes: a first input shaft selectively receiving power from an engine; a second input shaft continuously receiving power from the engine; an output shaft disposed in parallel with the first input shaft; a first countershaft disposed in parallel with the first input shaft; a second countershaft disposed in parallel with the second input shaft; a first shift unit making a series of desired gear shifts between the first input shaft and the output shaft and between the first input shaft and the first countershaft; a second shift unit arranged between the second input shaft and the second countershaft so as to carry out duplicate gear shifts, the duplicate gear shifts duplicating at least a portion of the gear shifts in the series of gear shifts of the first shift unit, each duplicate gear shift having a gear ratio substantially identical to a gear ratio of a corresponding gear shift of the first shift unit; a power connection unit transmitting power from the first countershaft to the output shaft; and a one-way clutch transmitting power from the engine only to the power connection unit through the second shift unit.

According to the present disclosure, the transmission for vehicle can prevent deterioration of smooth shifting and comfort riding due to torque interruption, and the present disclosure provides a transmission having a relatively simple and compact configuration, and it can be easily mounted in a vehicle and can contribute to improving fuel efficiency.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a diagram showing the configuration of a transmission for a vehicle according to an embodiment of the present disclosure;

FIGS. 2 to 5 are diagrams illustrating the operation of the transmission as shown in FIG. 1 from a neutral state to a first gear-driving state; and FIGS. 6 to 9 are diagrams illustrating the operation of the transmission as shown in FIG. 1 from the first gear-driving state to a second gear-driving state.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a transmission for a vehicle of the present disclosure includes: a first input shaft "IN1" that selectively receives power from an engine "E"; a second input shaft "IN2" that continuously receives power from the engine E; an output shaft "OUT" that is arranged in parallel with the first input shaft IN1; a first countershaft "CN1" that is arranged in parallel with the first input shaft IN1; a second countershaft "CN2" that is arranged in parallel with the second input shaft IN2; a first shift unit "SU1" that makes a series of desired gear shift between the first input shaft IN1 and the output shaft "OUT" and between the first input shaft IN1 and the first countershaft CN1; a second shift unit "SU2" that makes duplicate gear shifts, each having a gear ratio substantially identical to, or less than, a gear ratio of one of the gear shifts made by the first shift unit SU1, the gear shifts being between the second input shaft IN2 and the second countershaft CN2; a power connection unit that transmits power from the first countershaft CN1 to the output shaft OUT; and a one-way clutch "OWC" that transmits power from the engine E only to the power connection unit through the second shift unit SU2.

That is, the transmission of the present disclosure has, other than a basic line that can transmit the power to the output shaft OUT through the first shift unit SU1, a line that can transmit power from the engine E with a gear ratio substantially same as the gear ratio made by the first shift unit SU1 through the second shift unit SU2, thus interlocking between the power transmitted through the first shift unit SU1 and the power transmitted through the second shift unit SU2 can be structurally prevented by the one-way clutch OWC.

The first input shaft IN1, which is a hollow shaft coaxially arranged around the second input shaft IN2, is connected to the engine E through a clutch CL.

In this embodiment, the power connection unit comprises a drawing gear "IG" on the first countershaft CN1; a receive gear "RV" disposed on the output shaft OUT to receive power from the drawing gear IG; and an idler gear "ID" transmitting the power from the drawing gear IG to the receive gear RV.

Accordingly, the power from the first countershaft CN1 is transmitted to the output shaft OUT sequentially through the drawing gear IG, the idler gear ID, and the receive gear RV and then transferred to a differential "DF" etc. connected to the output shaft OUT.

In this embodiment, the one-way clutch OWC is arranged between the drawing gear IG and the second countershaft CN2 and configured to transmit the power from the second countershaft CN2 only to the drawing gear IG, not in the opposite direction.

Since the drawing gear IG is arranged on the first countershaft CN1, the one-way clutch OWC can be arranged between the first countershaft CN1 and the second countershaft CN2.

Assuming that all of the gear shifts made by the first shift unit SU1 are a series of gear shifts from a first gear shift having the largest gear ratio to an n-th gear shift having the lowest gear ratio, the duplicate gear shifts made by the second gear shift unit SU2 are a series of a first gear shift to an m-th gear shift (m≤n, n and m are natural numbers).

For example, if all of the gear shifts required by a vehicle are a first gear shift to a fifth gear shift, as in the depicted embodiment, the first shift unit SU1 is configured to be able to make a total of five forward gear shifts from a first gear shift having the largest gear ratio to a fifth gear shift having the lowest gear ratio, so n is 5, and the second shift unit SU2 is configured to be able to make first and second duplicate gear shift ratios, so m is 2.

The reason of m≤n is that the duplicate gear shifts made by the second shift unit SU2 play a part in reducing or preventing torque interruption that is generated in shifting and the torque interruption influences smooth shifting and comfort riding when a vehicle is driven at a low speed with a relatively large gear ratio.

That is, for example, if a vehicle has five forward gear shifts, the gear shifts where there is a problem with smooth shifting or comfort riding due to torque interruption while the vehicle is driven are typically the first gear shift to the third gear shift, but torque interruption does not often affect smooth shifting or comfort riding at higher gear shifts, because the speed and the inertia of the vehicle are substantially high and large at those gear shifts. Accordingly, the second shift unit SU2 makes first and second duplicate gear shifts having the same or substantially identical gear ratios as those of low gear shifts in order to improve torque interruption that may be generated at the first gear shift to the third gear shift.

In other forms, the number of duplicate gear shifts that are made by the second shift unit SU2 may be increased or decreased in accordance with the design concept of a vehicle to be manufactured, but a plurality of duplicate gear shifts can be made sequentially from the gear shift having the largest gear ratio.

Gear shifts having relatively large gear ratios of all of the gear shifts made by the first shift unit SU1 are made between the first input shaft IN1 and the first countershaft CN1.

In this embodiment, the first gear shift having the largest gear ratio and the next second gear shift are made between the first input shaft IN1 and the second countershaft CN1, because it is advantageous to make the first and second gear shifts between the first input shaft IN1 and the output shaft OUT.

For example, in the conventional art that is unlike the present disclosure, in order to make first and second gear shifts between the first input shaft IN1 and the output shaft OUT, it is required to dispose driving gears for making the first and second gear shift ratios on the first input shaft IN1 that is a hollow shaft and dispose driven gears for making gear ratios of the first and second gear shifts by engaging with the driving gears on the output shaft OUT. In this case, since the first input shaft IN1 is a hollow shaft, the outer diameters of the driving gears are necessarily larger than those when they are disposed on a solid shaft, which increases the outer diameters of the driven gears and which means that the distance between the first input shaft IN1 and the output shaft OUT necessarily increases. Accordingly, the transmission is increased in weight and volume and cannot be easily mounted in a vehicle, so it may be difficult to mount the transmission in light and small-sized vehicles.

However, as in the present disclosure, when the first and second gear shifts are made between the first input shaft IN1 and the first countershaft CN1, although the first input shaft IN1 is a hollow shaft, as in the above case, a gear ratio can be additionally made while power is transmitted from the first countershaft CN1 to the output shaft OUT through the power connection unit. Accordingly, even if a driving gear on the first input shaft IN1 is larger in outer diameter than that when it is formed on a solid shaft, it is possible to make a desired gear ratio, even though making the outer diameter of a driven gear, which is engaged with the driving gear, relatively small, such that the distance between the first input shaft IN1 and the first countershaft CN1 can be made relatively small.

Therefore, according to the present disclosure, by arranging the gear shifts in the way described above, the outer diameters of the driving gears and the driven gears for making gear shifts having higher gear ratios are reduced and the distance between the shafts is also reduced, so the weight and the volume of the transmission is decreased, which makes it easier to mount the transmission in a vehicle and considerably improves fuel efficiency.

In this embodiment, the second shift unit SU2 makes duplicate gear shifts corresponding to the gear shifts made between the first input shaft IN1 and the first countershaft CN1, in all of the gear shifts made by the first shift unit SU1.

The gear shifts made between the first input shaft IN1 and the first countershaft CN1 of all of the gear shifts made by the first shift unit SU1 in this embodiment are first and second gear shifts, and the duplicate gear shifts made between the second input shaft IN2 and the second countershaft CN2 by the second shift unit SU2 are also first and second gear shifts.

The first shift unit SU1 includes: a plurality of first unit driving gears U1D arranged on the first input shaft IN1 and configured to make all of the gear shifts; a plurality of first unit driven gears U1P for making gear shift by engaging with the first unit driving gears U1D, first unit driven gears U1P being arranged on the first countershaft CN1 and the output shaft OUT; and first unit synchronizers U1S arranged on the first countershaft CN1 and the output shaft OUT, respectively, for allowing or preventing rotation of the first unit driven gears U1P with respect to the first countershaft CN1 and the output shaft OUT.

The second shift unit SU2 includes: a plurality of second unit driving gears U2D arranged on the second input shaft IN2 for making the duplicate gear shifts; a plurality of second unit driven gears U2P arranged on the second countershaft CN2 for making the duplicate gear shifts by engaging with the second unit driving gears U2D; and a second unit synchronizer U2S arranged on the second countershaft CN2 for allowing or preventing rotation of the second unit driven gears U2P with respect to the second countershaft CN2.

In one form, the second shift unit SU2 may have the second unit synchronizer U2S not on the second countershaft CN2, but rather on the second input shaft IN2.

The operation of the transmission for a vehicle which has the configuration described above is described with reference to FIGS. 1 to 9.

For reference, in FIG. 1, an output gear OT is on the output shaft OUT to be able to transfer power to a ring gear R of the differential DF.

FIG. 1 shows a neutral state, in which the first unit synchronizers U1S and the second unit synchronizer U2S are all in a neutral state, so the engine E can be started regardless of whether the clutch CL is engaged or disengaged, but the clutch CL is has been disengaged in FIG. 1.

When the engine E is started in the state of FIG. 1, the first gear shift is made by the first shift unit SU1, as shown in FIG. 2, the clutch CL is engaged, as shown in FIG. 3, and then the power from the engine E is shifted through the first shift unit SU1 and transferred to the output shaft OUT through the drawing gear IG, the idler gear ID, and the receive gear RV, so the vehicle is started at the first gear shift.

After the vehicle is started in the state shown in FIG. 3, the second shift unit SU2 makes a first gear shift in duplicate, as shown in FIG. 4. Accordingly, in this state, the power from the engine E is transferred to the output shaft OUT through both of the first shift unit SU1 and the second shift unit SU2.

In the state shown in FIG. 5, the first gear shift made by the first shift unit SU1 requires to be shifted to the neutral to prepare for shifting to the second gear shift, in which, similarly, the power from the engine E keeps being supplied to the output shaft with the first gear shift made by the second shift unit SU2.

FIG. 6 shows a state when the clutch CL has been disengaged and the first shift unit SU1 has made the second gear shift from the state of FIG. 5, in which, similarly, the second input shaft IN2 directly receives the power from the engine E regardless of whether the clutch CL is disengaged or not, so the output at the first gear shift by the second shift unit SU2 keeps being transmitted to the differential DF through the output shaft OUT.

FIG. 7 shows shifting to the second gear shift by engaging the clutch CL from the state of FIG. 6, in which power transmitted through the clutch CL starts to be supplied to the output shaft OUT, with the gear ratio of the second gear shift through the first shift unit SU1.

The power shifted to the second gear shift through the first shift unit SU1 is applied to the output shaft OUT through the first countershaft CN1, but is not transmitted to the second countershaft CN2 by the one-way clutch OWC, so it does not interlock to the power transmitted to the second countershaft CN2 through the second shift unit SU2.

Accordingly, in this state, the vehicle is driven by the power at the first gear shift through the second shift unit SU2, and when the clutch CL is engaged, the power is shifted directly to the second gear shift through the first shift unit SU1 without torque interruption, so shifting is smoothly performed and comfort riding is improved.

In the state shown in FIG. 8, the second gear shift is made by the second shift unit SU2 from the state of FIG. 7, so the power from the engine E is supplied with the gear ratio of the second gear shift to the output shaft OUT through both of the first shift unit SU1 and the second shift unit SU2

FIG. 9 shows a state when the second gear shift by the first shift unit SU1 is disengaged from the state of FIG. 8, in which preparing for shifting to the third gear shift is performed, and similarly, the power from the engine E is transferred with the gear ratio of the second gear shift to the output shaft OUT through the second shift unit SU2.

Similar to shifting to the second gear shift from the first gear shift, shifting from the state of FIG. 9 to the third gear shift can be performed without torque interruption by disengaging the clutch CL, engaging the third gear shift through the first shift unit an, and then engaging the clutch CL.

In this embodiment, shifting to the fourth and fifth gear shifts is performed, similar to the related art, by disengaging the clutch CL, disengaging the previous gear shift, engaging the desired gear shift, and then disengaging the clutch CL only through the first shift unit SU1. Accordingly, although torque interruption is generated, as in the related art, they are higher gear shifts, so it does not largely influence smooth shifting or comfort riding, as described above.

Although an exemplary embodiments of the present disclosure have been described for illustrative purposes, those skilled in the art will appreciate that various modifications, additions and substitutions are possible, without departing from the scope and spirit of the present disclosure as disclosed in the accompanying claims.

What is claimed is:

1. A transmission for a vehicle, comprising:
   a first input shaft selectively receiving power from an engine;
   a second input shaft continuously receiving power from the engine;
   an output shaft arranged in parallel with the first input shaft;
   a first countershaft arranged in parallel with the first input shaft;
   a second countershaft arranged in parallel with the second input shaft;
   a first shift unit making a series of desired gear shifts between the first input shaft and the output shaft, and between the first input shaft and the first countershaft;
   a second shift unit arranged between the second input shaft and the second countershaft, and configured to make a series of duplicate gear shifts, each duplicate gear shift having a gear ratio substantially identical to at least one gear ratio of the desired gear shifts of the first shift unit;
   a power connection unit transmitting power from the first countershaft to the output shaft; and
   a one-way clutch transmitting power from the engine only to the power connection unit through the second shift unit.

2. The transmission according to claim 1, wherein the first input shaft is a hollow shaft fitted around the second input shaft and connected to the engine through a clutch.

3. The transmission according to claim 2, wherein the power connection unit comprises:
a drawing gear on the first countershaft;
a receive gear disposed on the output shaft to receive power from the drawing gear; and
an idler gear transmitting the power from the drawing gear to the receive gear.

4. The transmission according to claim 3, wherein the one-way clutch is arranged between the drawing gear and the second countershaft.

5. The transmission according to claim 2, wherein the one-way clutch is arranged between the first countershaft and the second countershaft.

6. The transmission according to claim 1, wherein the second shift unit makes the duplicate gear shifts corresponding to gear shifts made between the first input shaft and the first countershaft, in all of the gear shifts made by the first shift unit.

7. The transmission according to claim 1, wherein among the desired gear shifts made by the first shift unit, gear shifts having large gear ratios are made between the first input shaft and the first countershaft.

8. The transmission according to claim 1, wherein among gear ratios of the desired gear shifts performed by the first shift unit and of the duplicate gear shifts, a largest gear ratio of the desired gear shifts of the first shift unit is substantially identical to a largest gear ratio of the duplicate gear shifts, and wherein a lowest gear ratio of the duplicate gear shifts is larger than a lowest gear ratio of the desired gear shifts of the first shift unit.

9. The transmission according to claim 1, wherein the first shift unit further comprises:
a plurality of first unit driving gears arranged on the first input shaft and configured to make the desired gear shifts;
a plurality of first unit driven gears arranged on the first countershaft and the output shaft configured to make the desired gear shifts by engaging with the first unit driving gears; and
first unit synchronizers configured to allow or inhibit rotation of the first unit driven gears with respect to the first countershaft and the output shaft, the first unit synchronizers arranged on the first countershaft and the output shaft.

10. The transmission according to claim 9, wherein the second shift unit further comprises:
a plurality of second unit driving gears arranged on the second input shaft and configured to make the duplicate gear shifts;
a plurality of second unit driven gears arranged on the second countershaft and configured to make the duplicate gear shifts by engaging with the second unit driving gears; and
a second unit synchronizer arranged on the second countershaft and configured to allow or inhibit rotation of the second unit driven gears with respect to the second countershaft.

11. The transmission according to claim 9, wherein the second shift unit further comprises:
a plurality of second unit driving gears arranged on the second input shaft and configured to make the duplicate gear shifts;
a plurality of second unit driven gears arranged on the second countershaft and configured to make the duplicate gear shifts by engaging with the second unit driving gears; and
a second unit synchronizer arranged on the second input shaft and configured to allow or inhibit rotation of the second unit driving gears with respect to the second input shaft.

12. The transmission according to claim 1, wherein the series of desired gear shifts performed by the first shift unit include a number N of gear shifts, and wherein the series of duplicate gear shifts performed by the second shift unit include a number M of gear shifts, and wherein $M \leq N$.

* * * * *